(12) United States Patent
Leppek

(10) Patent No.: US 6,397,336 B2
(45) Date of Patent: *May 28, 2002

(54) INTEGRATED NETWORK SECURITY ACCESS CONTROL SYSTEM

(75) Inventor: James Leppek, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/740,295

(22) Filed: Dec. 19, 2000

Related U.S. Application Data

(63) Continuation of application No. 09/391,306, filed on Sep. 7, 1999, now Pat. No. 6,189,104, which is a continuation of application No. 09/054,705, filed on Apr. 3, 1998, now Pat. No. 5,974,149, which is a continuation of application No. 08/690,784, filed on Aug. 1, 1996, now Pat. No. 5,787,177.

(51) Int. Cl.[7] .................................................. H04L 9/00
(52) U.S. Cl. ...................... 713/201; 713/154; 709/229
(58) Field of Search ................................. 713/201, 153, 713/154; 707/9; 709/229

(56) References Cited

U.S. PATENT DOCUMENTS

| | | | |
|---|---|---|---|
| 3,245,045 A | 4/1966 | Randlev | 395/866 |
| 3,798,605 A | 3/1974 | Feistel | 380/25 |
| 3,858,182 A | 12/1974 | Delagi et al. | 395/186 |
| 3,931,504 A | 1/1976 | Jacoby | 395/186 |
| 4,827,508 A | 5/1989 | Shear | 380/4 |
| 4,961,224 A | 10/1990 | Yung | 380/25 |
| 5,204,961 A | 4/1993 | Barlow | 395/725 |
| 5,787,177 A | 7/1998 | Leppek | 380/25 |
| 5,974,149 A * | 10/1999 | Leppek | 380/25 |
| 6,088,451 A * | 7/2000 | He et al. | 380/25 |
| 6,125,390 A * | 9/2000 | Touboul | 709/223 |
| 6,189,104 B1 * | 2/2001 | Leppek | 713/201 |

* cited by examiner

*Primary Examiner*—Robert Beausoleil
*Assistant Examiner*—Scott T. Baderman
(74) *Attorney, Agent, or Firm*—Allen, Dyer, Doppelt, Milbrath & Gilchrist, P.A.

(57) ABSTRACT

A network resource security services control system comprises an integrated arrangement of security services, that are operative to control the ability of an information storage and retrieval network user to have access to and communicate with one or more information resources within the network. The security access control mechanism monitors activity associated with a user's attempt to and actual conducting of data communications with respect to a system resource, and controllably modifies one or more security relationships of a security association that has been established among the users and resources of the system, in dependence upon one or more characteristics of the monitored activity, in such a manner that affects the ability of the system user to conduct data communications with respect to a system resource.

10 Claims, 2 Drawing Sheets

INTEGRATED NETWORK SECURITY ACCESS CONTROL SYSTEM

RELATED APPLICATIONS

This application is a continuation of U.S. patent application Ser. No. 09/391,306, filed on Sep. 7, 1999, now U.S. Pat. No. 6,189,104, which is a continuation of U.S. patent application Ser. No. 09/054,705 filed on Apr. 3, 1998, now U.S. Pat. No. 5,974,149; which is a continuation of U.S. patent application Ser. No. 08/690,784 filed Aug. 1, 1996, now U.S. Pat. No. 5,787,177.

FIELD OF THE INVENTION

The present invention relates in general to data processing and communication systems, and is particularly directed to a data communication security access control mechanism, that is comprised of an integrated arrangement of security services, that are operative to control the ability of an information storage and retrieval network user to have access to and communicates with one or more information resources within the network. The security access control mechanism of the invention includes monitoring activity associated with a user's attempt to and actual conducting of data communications with respect to a system resource, and also the controllable modification of one or more security relationships of a security association that has been established among the users and resources of the system, in dependence upon one or more characteristics of the monitored activity, in such a manner that affects the ability of the system user to conduct data communications with respect to a system resource.

BACKGROUND OF THE INVENTION

The rapid expansion of the data communications industry, in particular the Internet and the World Wide Web (WWW), sometimes referred to as the superinformation highway, has provided data processing system users with what is effectively a global communication network interconnecting a vast number of databases and other network users. The local link between the network and the user is typically by way of a phone line (e.g., analog or ISDN, for example) of a public communication service provider, with the workstation hardware including a modem or terminal adapter equipment that allows dial-up access between the user and a remote party. Since a user's workstation is coupled directly to such interface equipment, any network user ostensibly has the ability to access any information resource coupled to a network node.

As a reduced complexity, non-limiting example, FIG. 1 diagrammatically illustrates a network user workstation 10 which is coupled via a communication link 11 to a local area network (LAN) 20 by way of a LAN interface 13. LAN interface 13 also provides access to an external network, such as a public communication services (PCS) network, including the Internet 30, that provides potential access to any network information resource (e.g., processor-accessible digital database). The local area network 20 to which user 10 is connected customarily includes one or more computer-based units, such as the illustrated workstations 21 and 22, network server 23 and printer 24, which are interconnected via a hub 25. The hub 25 is connected to the LAN interface 13, so that the end user workstation 10 may access any 'local' information resource of the LAN 20. In order to connect to the external network 30, the network interface 13 may be coupled through an electronic mail gateway 32 and a modem 33, whereby a dial-up connection may be provided to an Internet connection or other global resource provider 34, through which access to any node in the overall network is achieved.

Because the network provides a potential window into any information resource linked to any of its nodes, it is customary to both wrap or embed all communications in a 'security blanket' (some form of encryption) at a communication sourcing end, and to employ one or more permission (authorization and authentication) layers that must be used to gain access to another system resource (e.g., another computer). Once installed, such schemes operate as micro security systems, primarily as binary permission filters—the user is either permitted or denied access to a destination information resource, and are customarily limited to a relatively limited (and often fixed) set of access permission criteria. Now, while such schemes provide some measure of access control, they do not provide a macro perspective or control of all of the resources for which a given network security system may be configured.

SUMMARY OF THE INVENTION

In accordance with the present invention, this problem is effectively remedied by a new and improved network resource security access control mechanism that includes protection control, access control, event management and a pro-active security agent routines integrated within the communications control software resident in a data communications network control processor, for controlling the ability of a network user to have access to and communicate with one or more information resources of the network.

The protection control routine comprises cryptography algorithms and authentication mechanisms for protecting data transported over the network. The access control routine is used in conjunction with the protection control routine and includes right to access control factors, such as time of day, length of session, etc., components, with which a user's request for access and continued activity are compared to derive inputs to the event manager. The event manager is a principal control routine that is operative to monitors activity among users and resources of the network. As it monitors these events, the event manager may take action that will controllably intervene in the current network activity for a user of interest, in response to one or more relationships associated with such activity being satisfied.

For this purpose, each network resource object has a security association with respect to every other resource object in the network, that defines the ability and permission of a respective resource object to communicate with and gain access to that other resource object. These security associations may include one or more of the users' authorization and authentication codes, lists of other objects with whom the users may or may not communicate, access time limitations, what cryptography mechanisms may be or must be used, etc. As will be described, controlled intervention by the event manager includes the ability to affect or modify this security association and thereby a user's ability to gain access to or continue to be granted access to another resource object in the network.

The event manager may employ a separate set of policy rules that are not known to the user and serve as an additional layer of access control for enhancing the security of the network. Such policy rules are established external to the network and may include a prescribed activity intensity level associated with the number of or total length of time a resource object may communicate with another resource. In the event a policy rule is violated, the event manager may take relatively limited action, such as sourcing a query to the user to provide further authentication or other information, such as a request to the protection control routine to employ an increased level of cryptography complexity associated with a higher network usage level. On the other hand, if the security rule set employed by the event manager classifies excessive user activity as a substantial network security 'threat', it may call up the pro-active security agent routine, so as to impair the user's ability to use the network. The security rules themselves, as objects of the overall security access control system, may be modified or updated, as required to accommodate event changes, without necessarily terminating access to the network.

The pro-active security agent routine is a data communications impairment routine, which may be selectively called up by the event manager to perform one or more data communication interference exercises with respect to a data path or user data resource object of interest. As will be described, this routine is invoked in extreme cases where the event manager has determined that a user's further use of the network would constitute a substantial security threat.

DETAILED DESCRIPTION

Figure 1:
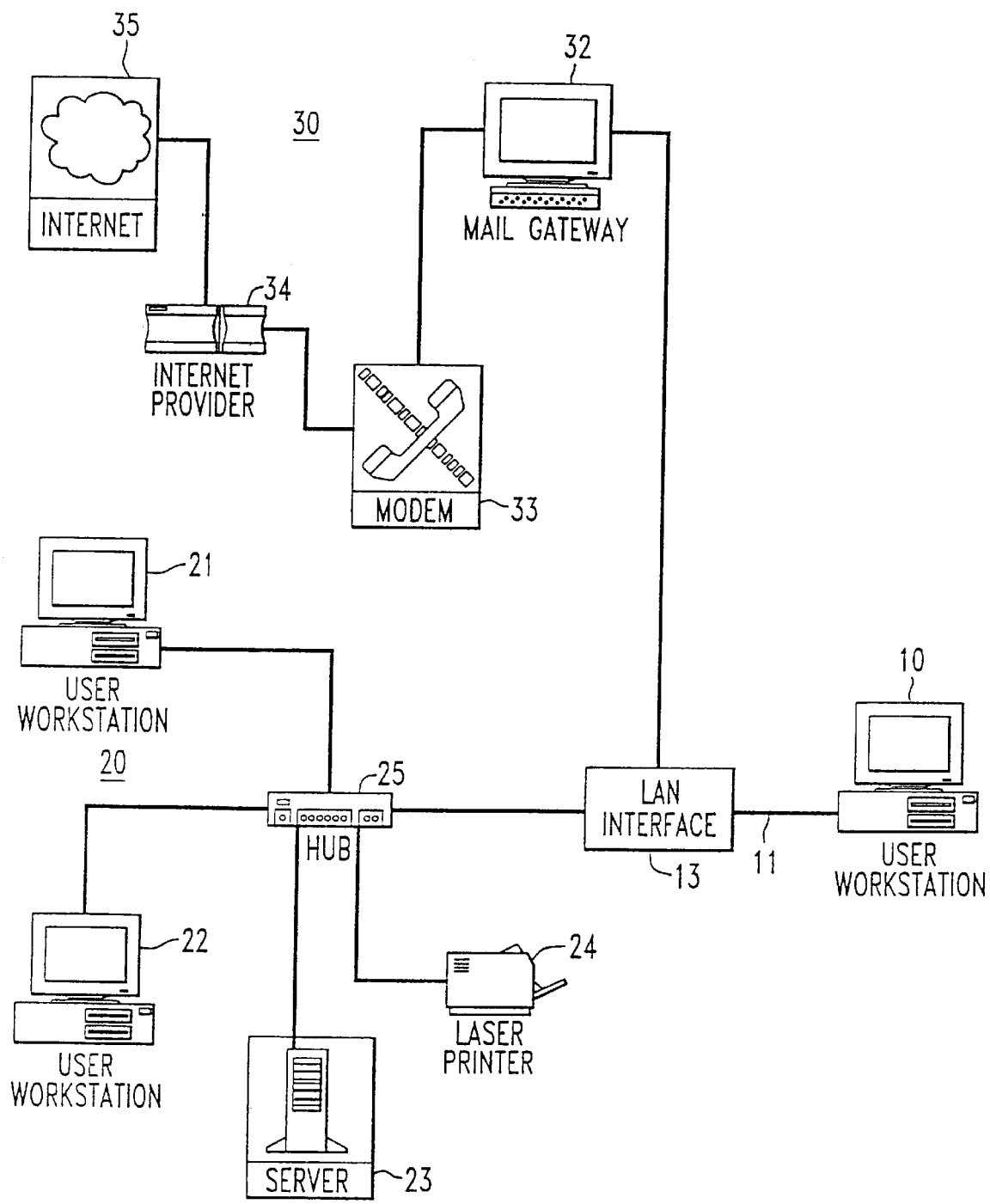
FIG. 1 diagrammatically illustrates a user workstation coupled to a local area network by way of a local area network interface, which also provides access to an external network.

Before describing in detail the new and improved network resource security access control mechanism in accordance with the present invention, it should be observed that the present invention resides primarily in what is effectively a new and improved data security access control mechanism implemented as an arrangement of abstract security services. These abstract security services include protection control, access control, event management and a pro-active security agent that are integrated within the communications control software resident in a data communications network control processor, for controlling the ability of a network user to have access to and communicate with one or more information resources of the network. The particular resources and the information they provide, per se, are not considered part of the invention.

Consequently, the manner in which the present invention communicates with and controls a user's access to such information resources have been illustrated in the drawings in readily understandable block diagram format, which show only those specific details that are pertinent to the present invention, so as not to obscure the disclosure with details which will be readily apparent to those skilled in the art having the benefit of the description herein. Thus, the block diagram illustrations are primarily intended to illustrate the major components of the system in a convenient functional grouping, whereby the present invention may be more readily understood. For a non-limiting example of an implementation of the present invention using industry-standard software coding, attention may be directed to the detailed software listings and attendant annotations in the attached Appendix.

Figure 2:
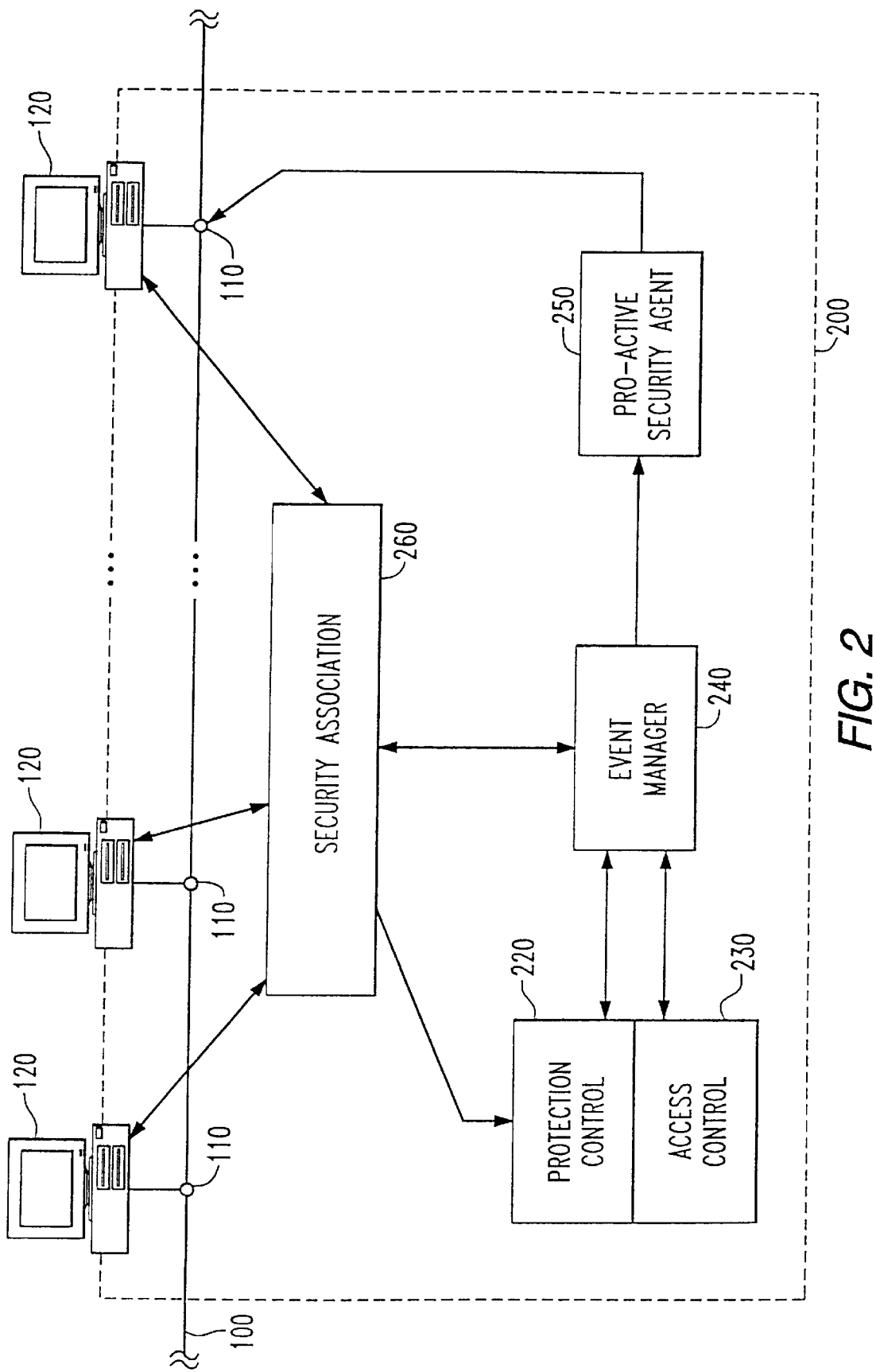
FIG. 2 diagrammatically illustrates a reduced complexity example of an information network interconnecting a plurality of information resource objects, communications among which are controlled by the network resource security services control system of the present invention.

Attention is now directed to FIG. 2, which shows a reduced complexity, non-limiting example of an information resource network 100 having a plurality of resource nodes 110, to which one or more information resource objects, such as respective computers 120 used by user's to couple to and process data transported over the network, may be coupled, and communications among which are supervised or controlled by a network resource security services control system 200. As pointed out briefly above, and as will be detailed infra, network resource security services control system 200 communicates with each of resource and communication control objects, and includes a protection control routine 220, and access control routine 230, and event manager 240 and a pro-active security agent routine 250, which interact with one another and with network resources, so as to control the ability of network users to gain access to, transmit and retrieve information with respect to any of the resources of the network.

The protection control routine 220 comprises cryptography algorithms and authentication mechanisms used by the security services control system 200 when transporting data over the network. Although the cryptography algorithms employed by protection control routine 220 are not limited to any particular type, a particularly suitable scheme is that described in my co-pending U.S. patent application Ser. No. 09/827,386, filed on even date, entitled "Virtual Encryption Scheme Combining Different Encryption Operators into Compound-Encryption Mechanism," assigned to the assignee of the present application and the disclosure of which is incorporated herein.

In accordance with such a 'virtual' encryption scheme, selected ones of plurality of different encryption operators stored in an encryption operator database are combined into a compound sequence of encryption operators. Data to be transported from a data source site, such as a user workstation, to a data recipient site, such as another workstation, is sequentially encrypted by performing a compound sequential data flow through this sequence prior to transmission. Because successively different encryption operators are used, the final output of the sequence will be a compound-encrypted data stream that has no readily discernible encryption footprint. As a consequence, even if a skilled data communications usurper possesses a decryption key for each encryption operators, there is a very low likelihood that he would be able to recognize the characteristics of any individual encryption operator. Moreover, without knowledge of the sequence of encryption operators a potential usurper will be forced to operate under a severe resource penalty that makes decryption of such a compound sequence a practical impossibility. At the recipient end of the data communications path, the recovery process involves the use of a complementary virtual decryption scheme that is the exact reverse of that used at the data source site.

The access control routine 230 is used in conjunction with the protection control routine 220 and includes right to access control factors, such as time of day, length of session, etc., components, with which a user's request for access and continued activity are compared to derive inputs to the event manager.

The event manager 240 is a routine that monitors network activity, in particular 'events' occurring as a result of activity among users and resources of the network. An event is an activity that occurs when a user executes activity in the network, or as a result of exercising or using a resource or object within the system.

An object is any potential participant in the system, such as a user, information resource, communication path, protection mechanism (such as a cryptography algorithm or user's authentication procedure within the protection control routine 220), an access control feature of the access control routine 230, etc.

Whenever a user initiates access to the network, multiple objects begin generating events. These events are applied to an events analyzer, which logically combines the event data into an output value. This output value is mapped through one or more rule sets producing network control prompts, which may cause the event manager 240 to take action that will controllably intervene in the current network activity for a user of interest, in response to one or more relationships associated with such activity being satisfied. Such controlled intervention by the event manager includes the ability to affect or modify this security association and thereby a user's ability to gain access to or continue to be granted access to another resource object in the network.

The pro-active security agent routine 250 is a data communications impairment routine, which is operative to conduct one or more data communication interference exercises with respect to a data path or user data resource object of interest. As will be described, this routine is invoked in extreme cases where the event manager has determined that a user's further use of the network would constitute a substantial security threat. As a pro-active data communications mechanism, security routine 250 is effective to partially or totally impair the user's ability to use the network, such that the user will be forced to take action that will be accepted as valid entry to the network.

As noted briefly above, each network resource object 120 has a security association 260 with respect to every other resource object in the network. This security association defines the ability and permission of a respective resource object 120$i$ to communicate with and gain access to another resource object 120$j$. As a non-limiting example, for a respective user's resource object, such a security association may include one or more of the user's identification codes (including one or more authorization and authentication codes), a list of other objects with whom the object may (and/or may not) communicate, limitations as to time of access (either in general and/or with those other resource objects), what cryptography mechanism that object is allowed to use, what cryptography mechanism that user must use for a given destination resource object, etc.

Thus, as a relatively simple illustration of a security association between two arbitrary resource objects 120$i$ and 120$j$, each resource object may be a respective computer user who employs a password (access authorization) and a prescribed cryptography algorithm through which communications with each other are to be conducted. As described above, cryptography algorithms and authentication mechanisms are stored within protection control routine 220 used by the security services control system 200 when transporting data over the network. In the present example it may also be understood that each of the resource objects 120$i$ and 120$j$ has a limited time of access to the other object (e.g., between 8:00 A.M. and 5:00 P.M., Monday through Friday). Such authorization criteria are known to authorized users of computers 120$i$ and 120$j$, and constitute a portion of a network usage rule set, with which such resource objects must comply when using the network.

In addition to such usage rules, the event manager 240 may also have a separate set of policy rules that are not known to the user and serve as an additional layer of access control for enhancing the security of the network. Such policy rules may include a prescribed activity intensity level, which is associated with the number of or total length of time a resource object 120$i$ is using the network to communicate with another resource object 120$j$. The policy rules may be based upon an a priori activity histogram for other users, with which the user/resource object 120$i$ is expected to conform. As an example, should a resource object 120$i$ spend considerably more time communicating with resource object 120$j$ than established by the histogram, this anomaly would be detected as a violation of policy rules and cause the event manager 240 to execute one or more responses that at least temporarily intrude into the user's network/resource object access session.

Such an event manager-sourced response may include, as a non-limiting example, a query to the user to provide further authentication (which would be associated with a predefined acceptable exception to the histogram norm, allowing the user greater network time than would otherwise be allocated for the destination resource object 120$j$). This aspect of the present invention contrasts with conventional schemes of simply rejecting (booting-out) a user who has failed an authorization or authentication query. Alternatively, by changing one or more aspects of the security association, the event manager may require the user to employ an increased level of cryptography complexity (associated with a higher network usage level).

As a non-limiting example of relatively severe action that may be taken, the security rule set employed by the event manager 240 for the current data session of interest may classify excessive user activity (in violation of user unknown policy rules) as a substantial network security 'threat'. In response to such a perceived threat, rather than immediately boot-out the user, it may begin to gradually take more drastic action, such as calling up the pro-active security agent routine 250, which then begins to assert prescribed data communication interference signals over the network to the resource object of interest, reconfigure data transport routers, etc., the effect of which is to begin impairing the user's ability to use the network, requiring the user to take action that will be accepted as valid entry to the network. On the other hand if the event manager has classified user activity as a very substantial threat, the pro-active security agent routine may execute major data communication jamming/overload activity with respect to the user, so that the user cannot simply reboot and attempt to circumvent the problem.

Moreover, the security rules themselves, being components or objects of the overall security access control system, may be modified or updated, as required to accommodate event changes, without necessarily terminating access to the network. Thus, in the above example of user activity that might otherwise be initially perceived as exhibiting a substantial network/resource security threat, depending upon the user's interactive response, the policy rules may allow for an adjustment to the threat threshold, before permitting or discontinuing further network access. That fact that each of the security system components is tied together through the events manager substantially facilitates integrating the security services control system into the communication control software of any size or type of data communication network.

As will be appreciated from the foregoing description, the network resource security services control system of the present invention provides an integrated arrangement of security services, that are operative to control the ability of an information storage and retrieval network user to have access to and communicate with one or more information resources within the network. This security access control mechanism includes monitoring activity associated with a user's attempt to and actual conducting of data communications with respect to a system resource, and also the controllable modification of one or more security relationships of a security association that has been established among the users and resources of the system, in dependence upon one or more characteristics of the monitored activity, in such a manner that affects the ability of the system user to conduct data communications with respect to a system resource.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

Appendix A SNARE Interpreted Boolean Language (SIBL)

A.1 Overview

The SNARE Interpreted Boolean Language (SIBL) governs the processing of the SNARE Security Program (SP) in three of its major functional areas:

a: Access Control
b: Event Recognition, and
c: Event Notification

Access Control Lists (ACLs) are used by the SP to determine which clients of a secured capability are, in fact, permitted to utilize that capability.

Event Antecedents (EAs) are used by the SP to determine when an event that some client, perhaps SP itself, cares about has occurred (e.g. is the event trigger control mechanism).

Event Consequences (ECs) are used by the SP to perform client-specified actions when an event of interest has occurred.

An ACL or EA is a network of named boolean equations which are evaluated in the environment of the SP. For an ACL, if this network evaluates to TRUE, then access to the associated resource is granted; otherwise access is denied. For an EA, if this network evaluates to TRUE, then the associated event is triggered (i.e. has occurred).

Each ACL or EA is a single "sentence" written in SIBL, is a collection of named boolean expressions or rules. Within this collection of rules, rules may reference other rules in the same set. However, one and only one rule exists which is not referenced by any other rule. It is the "distinguished" rule. The boolean value of this "distinguished" rule is the value of the sentence. Rules may not make recursive references (i.e. no circular rule references). Thus, for example, it would be illegal for "Rule1" to reference itself. Further, "Rule45" could not reference "Rule897", if that rule in turn referenced (through any chain of reference) back to the original "Rule45".

An example of a SIBL equation set used as an ACL:

acl: time>5 pm | user_name=="root" | (r1 & r2 & r3);
r1: host_name=="crusher" & application_name=="ftp";
r2: (current_cpu_utilization+expected_use)<0.80;
r3: r4 | r5 | r6;
r4: user_name=="fred";
r5: user_name=="barney";
r6: user_name=="wilma";

Note that the identifiers with the above expressions, such as 'user_id', 'time', or 'expected_use' are known as "accessor functions".

Accessor functions are programmer supplied routines inside the SP. They are made known to the ACL equation translator and run-time evaluator via a table at compile-time, and so are "hard-coded".

Accessor functions are the mechanism for SIBL sentence author to direct the SIBL evaluator at run-time to obtain data from the surrounding environment of the SP. The data provided may then be manipulated and tested by the equations comprising the SIBL sentence. Thus, any arbitrary state of the SP can be made available, via an accessor function, to the equation set in order to determine the access grant or event trigger condition. However, all accessor functions must be known and provided when the SP is compiled and linked.

SIBL is expressed using a sub-set of expressions from traditional C-like programming languages. SIBL sentences are processed in two steps. First, the text of the equation set is translated into an internal "p-code"-like binary interpretive form. Next, whenever necessary, the binary form of the sentence is evaluated in the current context of the SP to obtain its boolean result. This separation into translation and evaluation steps is purely for performance.

It is expected that the sentence equations are evaluated for their boolean grant value much more often than their manipulation as text. Thus, elimination of the overhead of textual processing during evaluation of the equations seems prudent. The format of the binary image of a sentence equation set is designed to be easily retained on a suitably encrypted mass storage device. This facilitates retention of compiled sentences from one execution of the SP to the next. In the framework of a suitable database, no recompilation of sentences is required; unless the SP itself is recompiled. This design of the sentence binary format may also, at some future date, facilitate the transport of a binary sentence, via an appropriately secure medium, from one secure host to another. The binary form of a sentence is relatively machine-independent, assuming compatibility of primitive data, such as: reals, integers, strings, etc.

A.2 SIBL Definition

A.2.1 Language Elements

In summary, the elements of SIBL which may be used to build equations and actions, and constraints governing their use, are:

a. available data types:
   a.1. boolean, integer, float, string, and time
   a.2. aggregates in the form of references to SP data objects.
   a.3. the equation translator enforce strong data typing.
b. available operations on the data:
   b.1. assignment(:)
   b.2. logical: complement (!), and (&), inclusive or (|), exclusive or (^)
   b.3. relational: equality (==), inequality (!=), greater than (>), greater than or equal to (>=), lesser than (<), less than or equal to (<=)
   b.4. arithmetic: addition (+), subtraction (−), multiplication (*), division (/)
c. accessor functions:
   c.1. permits client to obtain and/or compute any arbitrary value for use in a rule.
   c.2. enables dynamic state of the security system to influence outcome.
   c.3. may be any arbitrary function, but the intent is that they be very simple code snippets to fetch field values.
   c.4. the functions can not take any arguments.
   c.5. the functions must be callable from the "C" environment.

c.6. defined via a programmer supplied table. (e.g. a set of <name, type, function pointer>triples)

c.7. table is compiled into the translator's code; thus is "hard-coded".

d. lexical conventions (i.e. rules for grouping sets of characters to make up individual tokens of the language):

d.1. whitespace is not permitted within a token.

d.2. arbitrary whitespace and/or new-lines may separate tokens.

d.3. identifiers are a sequence of alpha-numeric characters, starting with a letter.

d.4. identifiers are case insensitive.

d.5. numbers are always expressed in base 10.

d.6. numbers may be signed. A plus sign for positive numbers is optional.

d.7. reals may be expressed in the usual scientific notation.

d.8. reals of integral value must still contain a decimal point to distinguish them from integers.

A.2.2 SIBL Grammar

A sentence in SIBL is either an acl-rule-set, an event-antecedent, or an event consequent. The software outside of the language processor understands which of these three contexts the recognition of the sentence should occur.

acl-rule-set::=(equation )+.
event-antecedent::=(equation)+.
event-consequent::=(equation | action)+.
action::=[name assignment-op]
   ("NOTIFY" user-application
   | "DELETE" object-reference
   | "MODIFY" object-reference ":" (field-modifier ("," field-modifier)*)
   | "CREATE" ("tag-value-list")"
   ) ";".
equation::=name assignment-op (expression | single-object-reference) ";".
field-modifier::=["APPEND" | "REMOVE"]attribute "=" expression.
expression::=relation (binary-boolean-op relation)*.
relation::=[unary-boolean-op] test.
test::=term (relational-op term)*.
term::=factor (adding-op factor)*.
factor::=primary (multiplying-op primary)*.
primary::="("expression")"
   | field-evaluation
   | combiner
   | name
   | acessor
   | attribute
   | time
   | string
   | integer
   | real.
name::=identifier. // the name of an equation.
accessor::=identifier. // the name of a client-supplied function.
user-application::=object-reference. // must resolve to a client object(s).
attribute::=single-object-reference "." tag.
single-object-reference::=object-reference // must resolve to a just 1 object.
   | "SELF"
   | name. // the name of a prior object reference equation object-reference::="OBJ" "("tag-value-list")". // may be multiple objs
tag-value-list::=tag "==" value ("," tag "==" value)*.
field-evaluation::="DISPATCH" "ON" (accessor | name) "("sub-field-expression-list ["," "ELSE" expression] ")".
combiner::="COMBINE" "USING" ("AND" | "OR") " ("sub-field-expression-list")".
sub-field-expression-list::=sub-field-expression ("," sub-field-expression)*.
sub-field-expression::=tag ("," tag)* "→" expression.
tag::=identifier. // one of the predefined field tags.
value::=// an arbitrary, possibly wild-carded, value identifier
   | string
   | integer.
time::=hour [":" min [":" sec]] ["AM" | "PM"].
hour::=integer.
min::=integer.
sec::=integer.
assignment-op::=":".
unary-boolean-op::="!".
binary-boolean-op::="&" | "|" | "^".
relational-op::="==" | "!=" | "←" | "<" | ">=" | ">".
adding-op::="+" | "−".
multiplying-op::="*" | "/".

A.3 Current Set of Accessors

TO BE RESOLVED:Add table containing current set of accessors we have defined and their return types.

Appendix B Integration of Algorithms Internal to the SP

B.1 Overview

Two ways exist to provide new algorithms through the SP. The first is to write an external crypto server to provide the algorithm. The second, which is the topic of this appendix, is to compile the code providing the new algorithm directly into the SP.

The two primary steps involved in adding a new internal algorithm to the SP are: writing the functions that provide the capabilities of the algorithm, and creating the database objects that represent the algorithm and its capabilities.

This appendix shows the steps necessary to create a very simple algorithm within the SP as an example. The algorithm to be created is XOR. XOR has two capabilities: Encrypt and Decrypt. It also has two aliases: Protect, which maps to Encrypt, and Unprotect, which maps to Decrypt.

B.2 Mapping Functions to the CryptoData Interface

To allow for consistent treatment of capabilities within the rest of the code, each capability of the new algorithm must conform to this common interface:

int functionname (CryptoData *);

where CryptoData is defined (in C for portability) as follows:

typedef struct cryptodata {
char *target_data; /* data to be transformed */
int target_data_length;
char *return_data; /* data returned */
int return_data_length;
char *key; /* key to be used, if any */
int key_length;
char *user_data; /* any other needed info */ char *user_data_length;
}CryptoData;

Taking this into account, we can write the function xor_encrypt ( ), which XOR's each byte of the target data with the single byte key provided. Note that the function is responsible for allocating space for its result.

```
int xor_encrypt (CryptoData *data) {
    // allocate space for the result
    delete data→return_data;
    data→return_data=new char[data→target_data_length];
    data→return_data_length=data→target_data_length;
    // make local copies of things that will change
    char *my_return_data=data→return_data;
    char *my_target_data=data→target_data;
    // do the encrypt or decrypt
    for ( int counter=0;
        counter<data→target_data_length;
        counter++ ) {
    *my_return_data++=*my_target_data++ ^ data→key;
    }
    return(0);
}
```

A characteristic of XOR is that encryption is performed in exactly the same manner as decryption, so we only need one function to do both jobs. This function needs to be put in with the rest of the Crypto functions in the file CR_CryptoEngine.cc, with a header in CR_CryptoEngine.h.

B3. Creating the Algorithm, Capability, and Alias Objects

With the code in place to implement the algorithm, database objects must now be created to make the algorithm available to clients of the SP. This is done within the constructor of the CryptoEngine, in the file CR_CryptoEngine.cc. Note that for clarity in this example, return values are not checked for errors.

First, two groups are created. One holds all of the capabilities of the algorithm, and the other holds all of the aliases of the algorithm. At first, these groups do not contain any members. The two objects of type SSP_Group_Object are created and given a name. They are put in the database with the_Data.put( ), and their common data fields are filled in with populate_common ( ).

Next, the Algorithm object is created. Since it is internally provided by the SP, its type is SSP_Int_Alg_Object. It is put in the Data Store; its algorithm name is set to "XOR"; its Capability and Alias Group object IDs are set to the IDs of the previously created groups; and some hints are set. The last step in creating the algorithm is to put its ID into the globally known Group object, algorithms, which contains all of the algorithms available in the system.

Once the Algorithm object is in place, its capabilities and aliases are created and added to their respective groups.

```
// create a group to hold the capabilities of the algorithm
cap_group=new SSP_Group_Object ("XOR Capabilities Group");
result=the_Data.put(cap_group);
cap_group→populate_common ( );
// create a group to hold the aliases of the algorithm
alias_group=new SSP_Group_Object("XOR Aliases Group");
result=the_Data.put(alias_group);
alias_group→populate_common( );
// create the algorithm
algorithm=new SSP_Int_Alg_Object("XOR Algorithm Object");
result=the_Data.put(algorithm);
algorithm→populate_common( );
algorithm→SetName("XOR");
algorithm→SetTag(1);
algorithm→SetCapabilitiesGroup(cap_group→object_id( ));
algorithm→SetAliasesGroup(alias_group→object_id( ));
algorithm→SetHintProtection(5);
algorithm→SetHintAuthentication(0);
algorithm→SetHintIntegrity(0);
algorithm→SetHintPerformance(150);
algorithm→put_member(algorithm→object_id( ));
// now create the "Encrypt" capability and add it to
// the algorithm's capability group
capability=new SSP_Capability_Object("Encrypt Capability Object");
result=the_Data.put(capability);
capability→populate_common( );
capability→SetName("Encrypt");
capability→SetTag(2);
capability→SetVisibility(3);
capability→SetFunction(xor_encrypt);
cap_group→put_member(capability→object_id( ));
// create the "Protect" alias and add it to the
// algorithm's alias group
alias=new SSP_Alias_Object("Protect Alias Object");
result=the_Data.put(alias);
alias→populate_common( );
alias→SetName("Protect");
alias→SetTag(0);
alias→SetCapID(capability→object_id( ));
alias_group→put_member(alias→object_id( ));
// now create the "Decrypt" capability and add it to
// the algorithm's capability group
capability=new SSP_Capability_Object("Decrypt Capability Object");
result=the_Data.put(capability);
capability→populate_common( );
capability→SetName("Decrypt");
capability→SetTag(3);
capability→SetVisibility(3);
capability→SetFunction(xor_encrypt);
cap_group→put_member(capability→object_id( ));
// create the "Unprotect" alias and add it to the
// algorithm's alias group
alias=new SSP_Alias_Object("Unprotect Alias Objects");
result=the_Data.put(alias);
alias→populate_common( );
alias→SetName("Unprotect");
alias→SetTag(1);
alias→SetCapID(capability→object_id( ));
alias_group→put_member(alias→object_id( ));
```

Appendix C Development of External Crypto Service

The External Crypto server is derived from the CryptoServer class i.e.:

```
class ExternalServer {
public:
    ExternalServer( ); // constructor
    ~ExternalServer( ); // destructor
    int processMessage( ); // process a request message
    int processInterface( ); // process command-line input
```

```
int register_server( ); // start the server—this needs to
    be public
    // because it is called by main
private:
    SNAPIStatus status; // for keeping status of operations
    CryptoServer *the_server; // the SNAPI crypto server
        object
    int trace_mode; // tracing on/off
    Buffer *buf; // buffer to hold command-line input
    int resign_server( );
    int trace( );
    int notrace( );
    int help( );
    int quit( );
};
```

Appendix D Recommended Reading

[1]. Booch, Grady. 1994. *Object-Oriented Analysis and Design With Applications.* 2nd Edition. Redwood City, Calif. The Benjamin/Cummings Publishing Company, Inc.

[2]. Stroustrup, Bjarne. 1993. *The C++ Programming Language.* 2nd Edition. Reading, Mass. Addison-Wesley Publishing Company. ISBN 0-201-53992-6.

[3]. Harris Corp. HISD. April 1995. *SNAPI Application Developers Guide.* Melbourne, Fla.

[4]. I.E.E.E. Computer Society. September 1994. *POSIX P1003.1c/D10—System Application Program Interface (API)—Threads Extension.* New York, N.Y.

[5]. Aho, Alfred V, Ravi Sethi, and Jeffrey D Ullman, 1986. *Compilers, Principles, Techniques, and Tools.* Addison-Wesley. ISBN 0-201-10088-6.

[6]. Waite, William M and Gerhard Goos, 1984. *Compiler Construction.* Springer-Verlag. ISBN 0-387-90821-8.

[7]. Parr, Terence John. To Be Published. *Language Translation Using PCCTS and C++ (AReference Guide),* preliminary draft for internet review is available on the World-Wide Web at URL:ftp://ftp-mountee.umn.edu/pub/pccts/1.33/Book/reference.ps.

[8]. Aho, Alfred V, John E. Hopcroft, and Jeffrey D. Ullman, 1974. *The Design and Analysis of Computer Algorithms.* Addison-Wesley. ISBN 0-201-00029-6.

What is claimed is:

1. A method of controlling access to a resource of a multi-resource information network comprising the steps of:

(a) providing security relationships among users and resources of said information network;

(b) selectively granting user access to a selected resource of said information network in accordance with at least one of the security relationships provided in step (a);

(c) monitoring activity associated with a network user's accessing said network resource selectively granted in step (b); and (d) in response to said activity monitored in step (c) having a prescribed relationship with respect to a security control procedure, modifying said one or more security relationships so as to increase the difficulty of said user to access a network resource.

2. The method according to claim 1, wherein step (d) comprises, in response to said activity monitored in step (c) having a prescribed relationship with respect to a security control procedure, modifying said one or more security relationships so as to require stricter verification of authorization by said user to access a resource of said information network.

3. The method according to claim 1, wherein step (c) comprises monitoring information generated by events associated with said user's being selectively granted access to said resource in step (b), and wherein step (d) comprises, in response to information generated by said events satisfying a predetermined relationship with respect to access control criteria governing access to and use of said information network, diminishing the ability of said user to access a network resource.

4. The method according to claim 1, wherein said security relationships among said users and resources of said information network include a protection control routine containing a plurality of cryptography operators and authentication mechanisms for protecting data transported over said network, an access control routine including control factors associated with a right to access said network, and an event manager which monitors activity among said users and resources of said network, and wherein step (d) comprises modifying one or more of said security relationships in dependence upon one or more characteristics of said activity monitored by said event manager, so as to increase the difficulty of said user to access a network resource.

5. The method according to claim 4, further comprising the step of:

(e) selectively invoking a data communications impairment routine which executes one or more data communication interference exercises with respect to a communication path or resource of interest, in response to said event manager determining that a user's further use of the network constitutes a security threat.

6. A digital processing system executable mechanism for controlling access to a resource of a multi-resource information network by performing the following steps:

(a) selectively granting user access to a selected resource of said information network in accordance with at least one of a set of security relationships among users and resources of said information network;

(b) monitoring activity associated with a network user's accessing said network resource selectively granted in step (a); and (c) modifying said one or more security relationships so as to increase the difficulty of said user to access a network resource, in response to said activity monitored in step (b) having a prescribed relationship with respect to a security control procedure.

7. The mechanism according to claim 6, wherein step (c) comprises, in response to said activity monitored in step (b) having a prescribed relationship with respect to said security control procedure, modifying said one or more security relationships so as to require stricter verification of authorization by said user to access a resource of said information network.

8. The mechanism according to claim 6, wherein step (b) comprises monitoring information generated by events associated with said user being selectively granted access to said resource in step (a) and, wherein step (c) comprises, in response to information generated by said events satisfying a predetermined relationship with respect to access control criteria governing access to and use of said information network, diminishing the ability of said user to access a network resource.

9. The mechanism according to claim 6, wherein said security relationships among said users and resources of said information network include a protection control routine containing a plurality of cryptography operators and authentication mechanisms for protecting data transported over said network, an access control routine including control factors associated with a right to access said network, and an event manager which monitors activity among said users and resources of said network, and wherein step (c) comprises modifying one or more of said security relationships in dependence upon one or more characteristics of said activity monitored by said event manager, so as to increase the difficulty of said user to access a network resource.

10. The mechanism according to claim 9, further comprising:

(d) selectively invoking a data communications impairment routine which executes one or more data communication interference exercises with respect to a communication path or resource, in response to said event manager determining that a user's further use of the network constitutes a security threat.

* * * * *